Oct. 31, 1933.   S. M. CHILD   1,933,095
CASTER
Filed Nov. 25, 1929
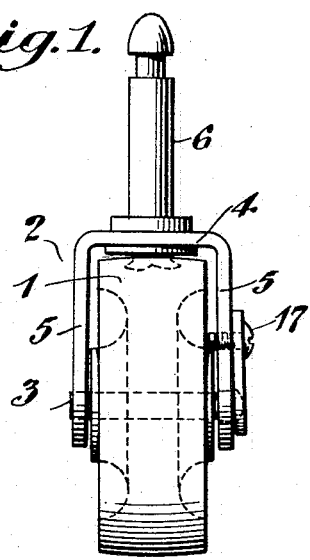
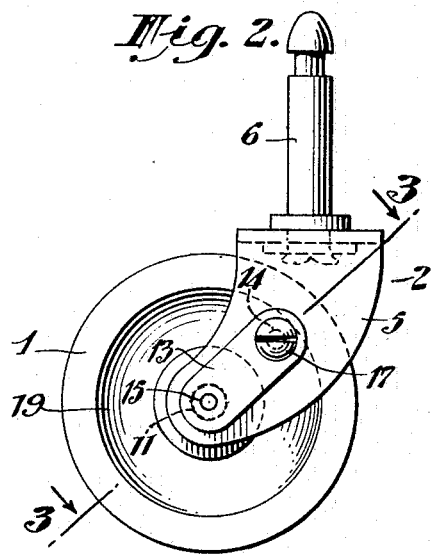
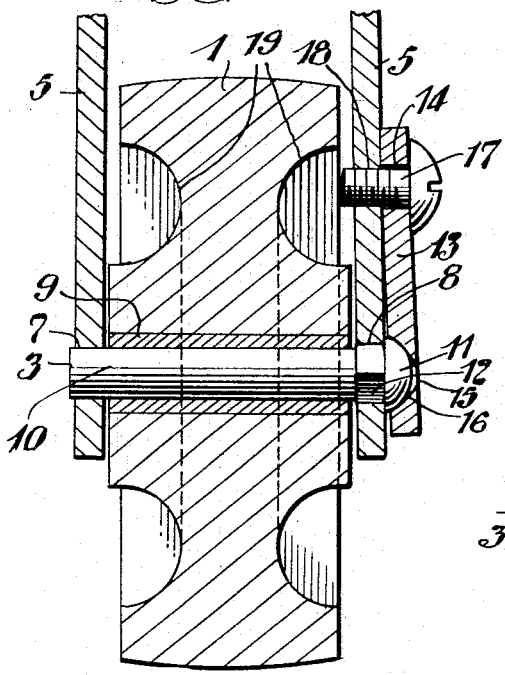
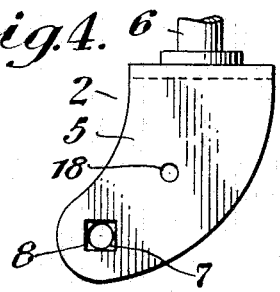
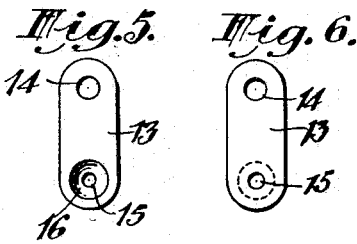
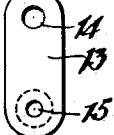
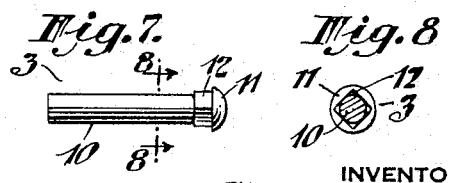
INVENTOR
Stanton M. Child
BY
ATTORNEYS Patented Oct. 31, 1933

1,933,095

UNITED STATES PATENT OFFICE 1,933,095

CASTER

Stanton M. Child, Brooklyn, N. Y.

Application November 25, 1929
Serial No. 409,660

2 Claims. (Cl. 16—38)

An important object of the present invention is to provide an improved caster designed for convenient removal and replacement of its wheel or roller by withdrawal and reinsertion of the axle thereof, and provided with a simple, secure and easily manipulated locking means for releasably holding the axle in place.

In the drawing, Fig. 1 is a front view of a furniture caster embodying my invention;

Fig. 2 a side view thereof;

Fig. 3 an enlarged section taken on the line 3—3 of Fig. 2;

Fig. 4 a side view of the wheel housing or yoke, with the wheel, axle and locking means removed;

Fig. 5 a view of the inner face of the locking plate for holding the axle in place;

Fig. 6 a view of the outer face of the plate;

Fig. 7 a detail side view of the axle; and

Fig. 8 a section taken on the line 8—8 of Fig. 7.

The caster includes a wheel or roller 1, a forked wheel housing or yoke 2, both of substantially standard form, and an axle 3. The housing is formed of metal and comprises a flat and rather broad top portion 4 and flat, broad depending arms 5 which straddle the wheel. Mounted upon the top portion 4 of the housing is a shank 6 for mounting the caster. Near their lower ends the arms 5 are formed with transversely alining apertures 7 and 8 for receiving the axle. Aperture 7 is round while aperture 8 is square and slightly larger than aperture 7. The wheel may be made of any one of a number of suitable materials, such as hard rubber for example, and is provided with a central bushing 9, preferably made of bronze, for rotating upon the axle.

The axle 3 is formed with a straight, cylindrical shank 10, a substantially hemi-spherical head 11 at one end and a squared portion 12 between said head and shank. The shank 10 is of a size to properly fit the bore of the wheel bushing for the rotation thereof and to slidably fit in the aperture 7 of the wheel housing. The squared portion 12 is formed to slidably fit in the square aperture 8 of the housing to hold the axle against rotation, and the head 11 is formed with a flat abutment face to bear against the outer face of the arm 5, around said aperture. Thus the axle is designed for easy insertion and withdrawal from its mounting.

A locking device of special design is provided to hold the axle firmly in place and still permit of its ready release and withdrawal when a broken or defective wheel is to be removed. This locking device includes a flat, elongated metal plate 13 formed near one end with an aperture 14 and near its opposite end with an aperture 15 whose edges are beveled as at 16 to form a concavity in one face of the plate. The plate 13 is made rather thick, as shown, to give it a desired stiffness. A stout, headed screw 17 fastens the locking plate or guard to the outer side of the housing arm 5 containing the square aperture 8. A threaded aperture 18 is tapped in said arm at a point spaced from aperture 8 a distance corresponding to that between the two apertures 14 and 15 of the locking plate, and the shank of the screw is passed loosely through aperture 14 and threaded into aperture 18. The mounted axle is held in place by engaging the concavity of the locking plate, formed by the bevel 16, with the head 11 of the axle and then tightening the screw 17 to clamp the locking plate firmly in position. The bevel 16 ensures a close fit with the axle head regardless of slight variations in the size of the latter. This engagement of the locking plate with the axle head not only holds the axle pressed inwardly in position but it locks the plate against lateral swinging around the screw 17 and displacement from the axle head. The axle head is so proportioned as to hold the locking plate tilted slightly outward from the face of the housing arm. Therefore when the screw is tightened the locking plate will exert a resilient reactive pressure upon the edge of the screw head to frictionally lock the screw against unscrewing. The locking of the axle against turning safeguards this screw-locking effect as it prevents relative movement and friction between the axle head and the locking plate and consequent vibration of the plate which might loosen the screw. The head of the screw 17 is of material width or diameter and the locking plate exerts its reactive pressure upon the peripheral edge of the head. This tends to cant the screw and bind its threads in the threaded aperture. Thus accidental loosening of the screw is effectually resisted by both the binding engagement of the peripheral edges of the screw head with the locking plate and the binding mutual engagement of the screw threads.

When the wheel 1 is to be removed the screw 17 is unscrewed sufficiently to permit the locking plate 13 to rock outwardly to free it from the axle head. The plate is made of considerable length between its apertures 14 and 15 in order to reduce the angular swing required for freeing the plate, and the aperture 14 is materially larger than the screw 17 to permit the plate to rock freely. After the plate has been rocked free from the axle head it is swung about the screw 17 as a pivot to a position out of alinement with the axle. The latter may then be freely withdrawn and the wheel removed. The opposite faces of the wheel are grooved as at 19, and screw 17 is located in register with the adjacent groove which provides clearance for the inner end of the screw. This enables the use of a screw of material length which will not become detached when unscrewed sufficiently for the release of the locking plate.

Heretofore it has been customary to discard furniture casters when their wheels or rollers become broken or defective, owing to the fact that their axles are fixed permanently in place, usually by clenching or upsetting their ends. The present invention provides, in a thoroughly practical and satisfactory manner, for the removal of a defective wheel and the mounting of a new one so that the remainder of the caster may be preserved. This improvement does not weaken or objectionably complicate the caster. The latter is as strong and reliable as a caster with a permanently fixed axle.

What I claim is:

1. A caster comprising a wheel having an axle bore; a forked wheel housing straddling said wheel and having axle apertures in its opposite arms alining with said bore in the wheel; a removable axle extending through said bore and apertures and provided at one end with a head to bear against the outer side of one of the housing arms and formed to protrude therefrom; a locking plate of material stiffness and resilience having a concavity in one face to fit said head and having an aperture spaced from said concavity; a screw extending through said aperture in the locking plate threaded into the wheel housing and having a wide head with a peripheral edge to bear against the locking plate and clamp it against the axle head, the axle head and said plate concavity being proportioned with relation to each other to hold the locking plate tilted away from the housing arm and in engagement with said edge of the screw head to exert a resilient reactive pressure thereon at a point located between the shank of the screw and the axle head, said pressure acting to bind the screw head to the locking plate and tending to cant the screw thread and bind it to the wheel housing to prevent unscrewing of the screw, and the locking plate being rockable outward free of the axle head and free to swing about the screw as a pivot when the screw is loosened; and locking means independent of the locking plate and holding the axle against turning in the wheel housing.

2. A caster comprising a wheel having an axle bore; a forked wheel housing straddling said wheel and having axle apertures in its opposite arms alining with said bore in the wheel; a removable axle extending through said bore and apertures and provided at one end with a head to bear against the outer side of one of the housing arms and formed to protrude therefrom; a locking plate of material stiffness and resilience having a concavity in one face to fit said head and having an aperture spaced from said concavity; and a screw extending through said aperture in the locking plate, threaded into the wheel housing and having a wide head with a peripheral edge to bear against the locking plate and clamp it against the axle head, the axle head and said plate concavity being proportioned with relation to each other to hold the locking plate tilted away from the housing arm and in engagement with said edge of the screw head to exert a resilient reactive pressure thereon at a point located between the shank of the screw and the axle head, said pressure acting to bind the screw head to the locking plate and tending to cant the screw and bind its thread to the wheel housing to prevent unscrewing of the screw, and the locking plate being rockable outward free of the axle head and free to swing about the screw as a pivot when the screw is loosened.

STANTON M. CHILD.